(12) United States Patent
Ortmann (10) Patent No.: US 7,209,854 B2
(45) Date of Patent: Apr. 24, 2007

(54) TEMPERATURE MONITORING SYSTEM

(75) Inventor: Jorg Ortmann, Huckeswagen (DE)

(73) Assignee: Land Instruments International Limited, Sheffield (GB)

( * ) Notice: Subject to any disclaimer, the term of this patent is extended or adjusted under 35 U.S.C. 154(b) by 0 days.

(21) Appl. No.: 11/089,454

(22) Filed: Mar. 23, 2005

(65) Prior Publication Data

US 2005/0243892 A1 Nov. 3, 2005

(30) Foreign Application Priority Data

Mar. 24, 2004 (GB) ................... 0406653.6

(51) Int. Cl.
G01K 1/00 (2006.01)
G01K 5/00 (2006.01)
G01K 7/00 (2006.01)
G01K 11/00 (2006.01)

(52) U.S. Cl. .................................................... 702/130
(58) Field of Classification Search .................. 702/94, 702/95, 99, 130, 132, 134, 136, 150; 250/252.1, 250/330, 334
See application file for complete search history.

(56) References Cited

U.S. PATENT DOCUMENTS

2004/0251407 A1 12/2004 Young

FOREIGN PATENT DOCUMENTS

EP 1 579 981 * 9/2005

* cited by examiner

*Primary Examiner*—Michael Nghiem
(74) *Attorney, Agent, or Firm*—Townsend and Townsend and Crew LLP (57) ABSTRACT

A temperature monitoring system for generating a representation of the temperature of the regions of a heated sheet of a rotary thermoforming machine includes a temperature detector for detecting the respective temperatures of areas of the sheet extending in a line across the sheet, a system for monitoring relative movement between the sheet and the temperature detector; and a processing system for a) recording the coordinates and temperature of each area whose temperature is monitored; and b) determining the temperature of regions of the sheet defined on a different basis to the areas by applying a predetermined algorithm to the data stored in step a) which takes account of the rotary movement of the sheet.

22 Claims, 7 Drawing Sheets

TEMPERATURE MONITORING SYSTEM

CROSS-REFERENCES TO RELATED APPLICATIONS

This application claims priority from GB Application No. 0406653.6, filed Mar. 24, 2004, the entire disclosure of which is incorporated by reference.

BACKGROUND OF THE INVENTION

The invention relates to a temperature monitoring system for use with a rotary thermoforming machine. In a particular example it relates to use of an infra-red linescanner to obtain temperature images of plastic sheets on the "carousel" of a rotary thermal forming machine.

In typical thermal forming processes, plastic sheets are heated prior to being formed into various articles. Examples of such articles include baths, refrigerator liners, car dashboards and yoghurt cartons.

Heating softens the plastics material, and is usually carried out by placing the plastic sheet underneath a heater panel or between two such panels. Forming is then usually carried out by "sucking" the softened sheet into a mould. Typically this is achieved by creating a vacuum or low pressure in the mould cavity and allowing the softened plastic to be pressed into the mould by the action of atmospheric or applied pressure.

Depending on the application, the sheets can be large. For example, each sheet may be up to several square meters in area.

Often, rather than heat the entire plastic sheet to a uniform temperature, it is desirable to establish a temperature pattern in which the temperature varies across the sheet in a controlled manner. For instance, higher or lower temperatures (i.e. softer or harder plastic) may be required in different regions of the sheet depending on the amount of deformation those regions will experience in the forming process.

The temperature of the heater panel is controlled in a large number of "zones". This is done by conventional control of numerous electrical resistance heaters to temperature setpoints.

In linear thermoforming machines, the sheets move in a straight line throughout the process. In rotary thermoforming, machine sheets are attached to a revolving "carousel" and move in a circle or along a circular arc.

For accurate control of the thermoforming apparatus, it is useful to obtain a temperature image of the plastic sheet just after heating—e.g. as it leaves the heater panel. Comparison of this image with an "ideal" image allows the heater panel set-points to be optimized.

Specifically it is desirable to obtain a temperature "map" referenced to, and correctly dimensioned with respect to, the (usually rectangular) sheet. This temperature map can then be directly related to the heater pattern. For example specific areas on the map may be identified as corresponding to specific heaters (or groups of heaters operated from a single controller) in the heating panel. It is further possible to over-lay the temperature map on to a drawing of the thermoformed sheet—this allows the temperature pattern to be related directly to the deformation pattern.

A temperature image of the sheet may be obtained using an infra-red linescanner. The sheet moves substantially horizontally and the linescanner is aimed substantially vertically with its scan plane transverse to the direction of sheet motion. The 1-dimensional scan plus the sheet's linear motion allows a 2-dimensional image to be captured.

For example, a typical infra-red linescanner may capture 1000 temperature points along each scan line and make 100 scans per second. Thus, if the sheet takes 2 seconds to traverse the scan plane, a 1000 by 200 pixel temperature image results.

Typically the linescanner uses an opto-mechanical scanning device. This rotates a measurement axis, aligned to the infra-red beam, at fixed angular velocity within a scan plane. The centre of rotation is a rotation axis, perpendicular to the scan plane, located inside the linescanner sensing head. The instantaneous measurement point on the sheet is the intersection of the measuring axis with the plastic sheet.

Before discussing the problems encountered with linescanning on rotary machines it is useful to consider the simpler situation of a linear machine.

Here the sheet moves horizontally in a straight (rectilinear) line. We will assume, for the moment, that the sheet is rectangular and moves at constant speed in a direction parallel to its length.

The linescanner is typically fixed above the centre-line of the sheet and adjusted so that the scan plane is vertical and perpendicular to the sheet's motion.

The linescanner generates a temperature signal according to the instantaneous position of its measurement axis.

The linescanner also generates a "scan valid" signal. This is a rectangular waveform whose rising and falling edges mark the beginning and end of valid measurements for each scan. Typically these correspond to the measurement axis being 40 degrees either side of "scan-centre". Typically scan-centre is perpendicular to the front face of the scanning instrument and, in this arrangement, to the plane of the sheet.

The two signals are processed by a computer or processor. The temperature signal is sampled at uniform time intervals. Data is recorded only when the scan valid signal is "high" and is organized into a series of "scan lines", a new line being started each time the scan valid signal transitions from low to high.

Temperature samples within each scan line are numbered.

Scan lines are also numbered, e.g. starting from when temperatures above a pre-set threshold are detected—for instance when the sheet starts to cross the scan plane. Alternatively, the start of count may be triggered by an external digital signal which flags arrival of the target sheet.

The data obtained from the linescanner is processed in a Cartesian array of samples and the temperature image is displayed on the computer screen as a Cartesian array of pixels whose color represents temperature according to a pre-defined "palette". In this array, the ordinate (i.e. row) corresponds to the sample number and the abscissa (i.e. column) corresponds to the scan line number. The image builds up approximately in real time as the sheet crosses the scan plane.

However, a temperature image constructed according to the above method is geometrically distorted with respect to the plastic sheet. The following factors contribute to this:

1. The temperature samples are taken at equal time intervals, which do not equate to equal spatial intervals across the width of the sheet. Specifically, there is a $\sec^2\theta$ variation where $\theta$ is the angle between the instantaneous position of the measurement axis and the vertical (perpendicular to the plane of the sheet).
2. The sheet moves throughout the time taken to make each scan line. Scan lines are therefore slightly oblique when referenced to the sheet, i.e. not completely parallel to the sheet edge.

3. The x axis is not correctly scaled relative to the y axis.

For many purposes these distortions are not serious. The image of a rectangular sheet moving at constant speed in a direction parallel to its length remains rectangular and it is easy to visually relate the temperature image to the sheet geometry and hence to the zone pattern on the heater panel.

If required, the distortions can be removed. Effect (2) is typically small and can be reduced arbitrarily by increasing the scan speed. Effect (3) is obviated by re-scaling the image to match known sheet dimensions. Effect (1) may be removed by additional processing as follows:

For each temperature sample, the instantaneous angle θ of the measurement axis to the vertical is calculated from the known sample number, sample interval and pre-set parameters in the linescanner.

For example, assuming that the scan valid signal rises 40 degrees before scan centre and falls 40 degrees after scan centre and that at scan centre the measurement axis is vertical. The measurement axis makes 100 full 360 degree rotations per second—i.e. the scanning line traverses the 80 degree measurement zone in 2.22 milliseconds. Temperature samples are taken every 2.22 microseconds (1000 samples per scan) following the rise of the scan valid signal. In this case, the angle θ for the nth sample is θ=40*(n/500−1).

The instantaneous position Y of the measurement point across the width of the sheet, referred to the scan-centre, is then calculated as Y=H*tan θ where H is the measured height of the linescanner above the sheet. This height measurement is made to the centre of rotation of the measurement axis (this position is fixed and known in relation to the linescanner housing).

Each temperature sample is thus labeled with a true position across the sheet.

The data is now plotted on the computer screen as a Cartesian array of pixels where the "Y" position (i.e. row) represents position-across-sheet, whereas the "X" position (i.e. column) is scan line number as before. The pixels are positioned at uniform Y increments which will not, in general, correspond exactly to measured sample positions. The appropriate temperature at a given pixel location is calculated by interpolating between adjacent samples or by assigning to the pixel the temperature of the nearest-located sample.

In some linear machines, the sheet velocity varies substantially while the sheet is under the scanner. This leads to a more serious distortion. Scan lines are now spaced non-uniformly along the sheet. A Cartesian temperature image with ordinate in scan line number "stretches" those parts of the sheet which move slower through the scan plane and "squashes" those parts which move faster.

This can be rectified only if a sheet position (or speed) signal is made available to the computer. This allows scans to be labeled with position-along-sheet rather than just scan number. A Cartesian temperature image can then be constructed where the abscissa is position-along-sheet.

In a rotary thermoforming machine, the sheet moves in a circle or arc rather than a straight line. Further, the speed is far from uniform. As a result, temperature images obtained using linescanners suffer massive geometrical distortion.

Typically up to four sheets are mounted horizontally on a carousel which rotates about a vertical axis. The carousel moves rapidly, with high acceleration and deceleration, through successive (on a four sheet machine) 90 degree movements. The following discussion focuses on a four sheet machine. However, the mechanism is similar for machines with any other number sheets.

Referenced to the ground, G, beneath the carousel there are four locations, referred to as; "load", "heat", "form" and "cool".

The journey of an individual sheet is as follows:
Placed on the carousel at the "load" location
Moved to the "heat" position (between the heater panels) and held for specified time
Moved to the "form" position, sucked into the mould and subsequently expelled from it
Moved to the "cool" location to cool and subsequently be removed from the carousel.

If an infrared linescanner is mounted so as to scan the sheets exiting the "heat" position and a Cartesian temperature image is plotted with sample number and scan number as ordinate and abscissa respectively (using the above described technique) then a grossly distorted temperature image is obtained.

The distortion is caused primarily by two effects:

1. The "outer" edge of the sheet traverses the scan plane faster than the "inner" edge. Thus, referred to the sheet, scan lines are further apart at the outer edge than at the inner edge. On the temperature image however scan lines are parallel. This is depicted schematically in FIGS. 6A and 6B where R–R'=represents the sheet's inner edge and Q–Q'=the outer edge.

2. Since the sheet accelerates and decelerates during rotation, the leading and trailing edges of the sheet traverse the scan plane slower than does the centre of the sheet. Thus, referred to the sheet, scan lines are further apart in the centre of the sheet than at the leading and trailing edges. On the temperature image, scan lines are equidistant.

It is very difficult to visually relate the resulting temperature images to the sheet or to the zone pattern of the heater panel.

One technique for reducing this distortion is disclosed in U.S. 2004/0251407. This system uses a zone calibrator sheet, prepared by the user, which has the position of the heating zones defined on its surface by a thermally contrasting material. The calibrator sheet is transported through the thermoforming apparatus, with or without heating, and imaged using a line scanner. The user then traces the position of each heating zone on the resulting distorted image to produce a grid image which is stored and used for comparison with thermal images of subsequent sheets.

This method suffers from a number of disadvantages. The use of a calibration object is expensive and time consuming, requiring a new calibration sheet for each new heating pattern or sheet size and shape. As a result, calibration is not performed in real time. The system requires a lot of user intervention, both in producing the calibration sheet and in interpreting its image so as to generate the grid. Each of these steps will introduce error. Further, the accuracy of the calibrated image is inherently low since the resolution is limited to zones and the system cannot compensate for unexpected variations in sheet position, velocity or acceleration.

SUMMARY OF THE INVENTION

In accordance with one aspect of the present invention, we provide a temperature monitoring system for generating a representation of the temperature of the regions of a heated sheet of a rotary thermoforming machine, the system comprising a temperature detector for detecting the respective temperatures of areas of the sheet extending in a line across the sheet, a system for monitoring relative movement between the sheet and the temperature detector; and a processing system for a) recording the coordinates and temperature of each area whose temperature is monitored; and
b) determining the temperature of regions of the sheet defined on a different basis to the areas by applying a predetermined algorithm to the data stored in step a) which takes account of the rotary movement of the sheet.

The invention provides a way of "rectifying" the temperature images so that they properly represent the geometry of the (usually rectangular, plastic) sheets.

This system requires no calibration object, instead performing a full co-ordinate transformation based on measurements of the machine/scanner geometry which results in an accurate, corrected image. The expense and time associated with the use of a calibration sheet is eliminated and the resolution is greatly improved. Moreover, user intervention is reduced to a minimum, since the system itself performs the required correction. Further, this technique compensates the raw data rather than the image "result". Here, the compensated data can be used to build up the desired image from a complete set of raw data. Prior art techniques, such as that described above, merely produce a compensated result by organising a subset of the raw data into a geometrical arrangement to appear as though it is a corrected image of the raw data.

Typically, the temperature detector is a rotary linescanner with an opto-mechanical scanning mechanism such as a mirror although a fixed, linear array such as a CCD array could be used.

Although the processing system could carry out steps a) and b) for all areas of the sheet before displaying the results, in a particularly preferred aspect of the invention, the processing system is adapted to carry out steps a) and b) during the detection process and thus in real time, or substantially in real time. There may be a delay of a few scan lines. Where a display is provided, this enables the temperatures of the regions to be displayed during the scanning process with groups of regions being successively displayed until the full sheet can be seen.

The invention also enables a high resolution result to be achieved. Indeed, in the preferred example, the processing system is adapted to define the regions at substantially the same resolution as the areas. Typically, this means that the resolution of the regions is within 5% of the resolution of the areas. For example, it is preferred that the system performs a complete point-to-point transformation. The rectified image is obtained at substantially the same spatial resolution as is present in the "raw" (uncorrected) image.

BRIEF DESCRIPTION OF THE DRAWINGS

An example a temperature monitoring system according to the invention will now be described with reference to the accompanying drawings, in which.

DESCRIPTION OF SPECIFIC EMBODIMENTS

The rotary thermoforming machine shown in the drawings comprises a carousel 1 on which are provided four plastic sheets 2 to 5. In operation, the carousel 1 is rotated in the direction of an arrow 6 so as to bring each sheet 2 to 5 to respective load, heat, form and cool stations.

Figure 2:
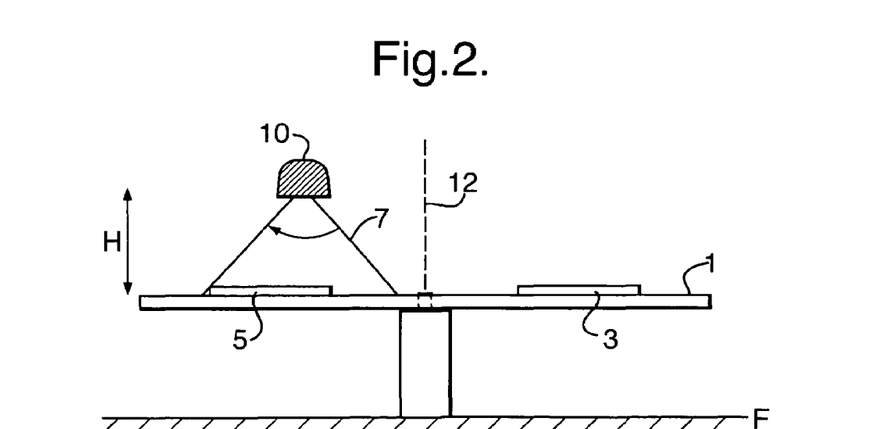
FIG. 2 is a schematic side view of the machine shown in FIG. 1.
Figure 4:
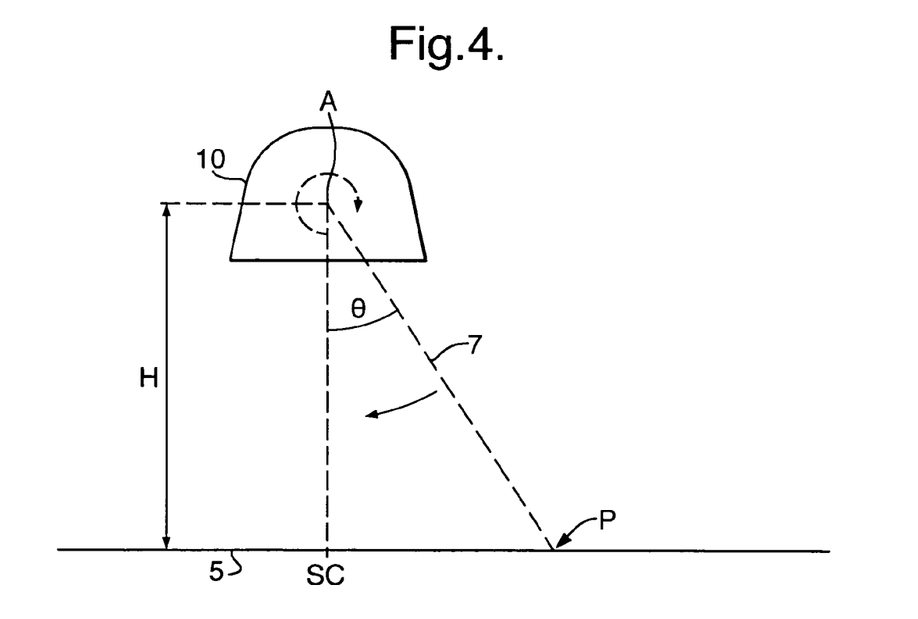
FIG. 4 illustrates schematically the linescanner of FIG. 1.

Located above the carousel 1 is a linescanner 10 shown in more detail in FIGS. 2 and 4. The linescanner 10 comprises a photodetector or the like together with a pivoted mirror (not shown) and an in-built laser. The laser generates a beam of light 7 which is rapidly scanned by the mirror along a scan line 11 in a scan plane S, extending radially from the axis 12 of rotation of the carousel 1.

The linescanner 10 is connected to a microprocessor 14 which in turn is connected to a data store 15 and a monitor display 16.

Figure 3:
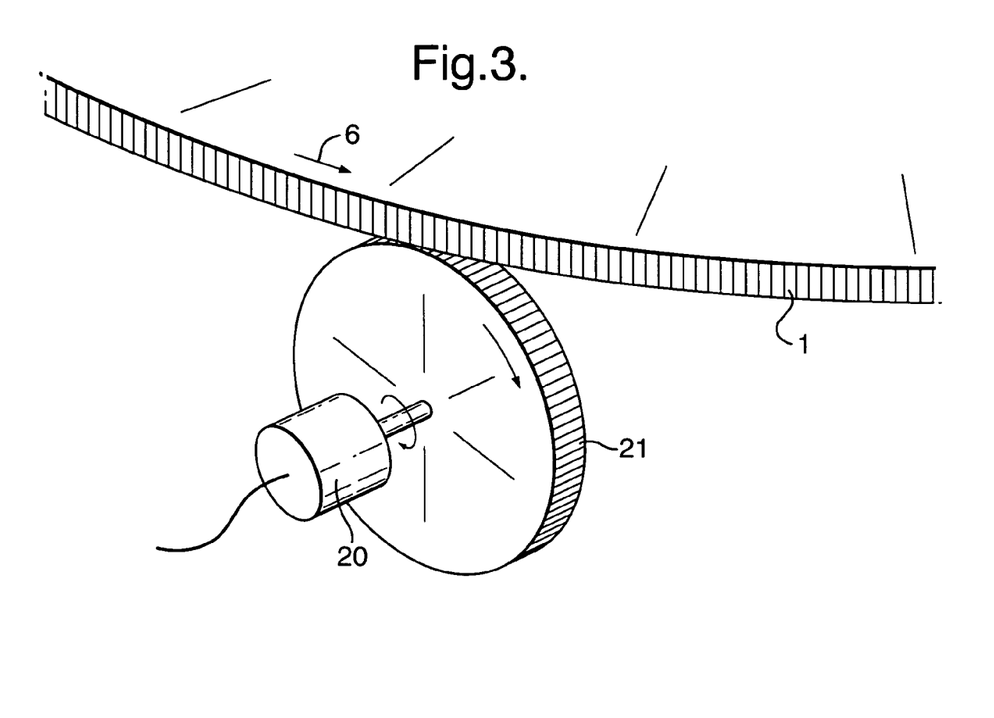
FIG. 3 illustrates part of the machine shown in FIG. 1 in more detail.

The carousel 1 is continuously rotated by a motor (not shown) and the rotational position is determined by a rotary encoder 20 coupled with a rubber friction wheel 21 which engages the carousel 1 (FIG. 3). The contact with the carousel 1 may be on the outer circumference of the carousel (as shown) or any convenient circular feature.

A preferred method for compensating for distortion in a generated thermal image will now be described, suitable for use with the above apparatus.

As explained above, the goal is to process and display temperature values which are positionally referenced to the actual sheet dimensions. This requires "rectification" of the distorted data generated by the linescanner 10.

Figure 1:
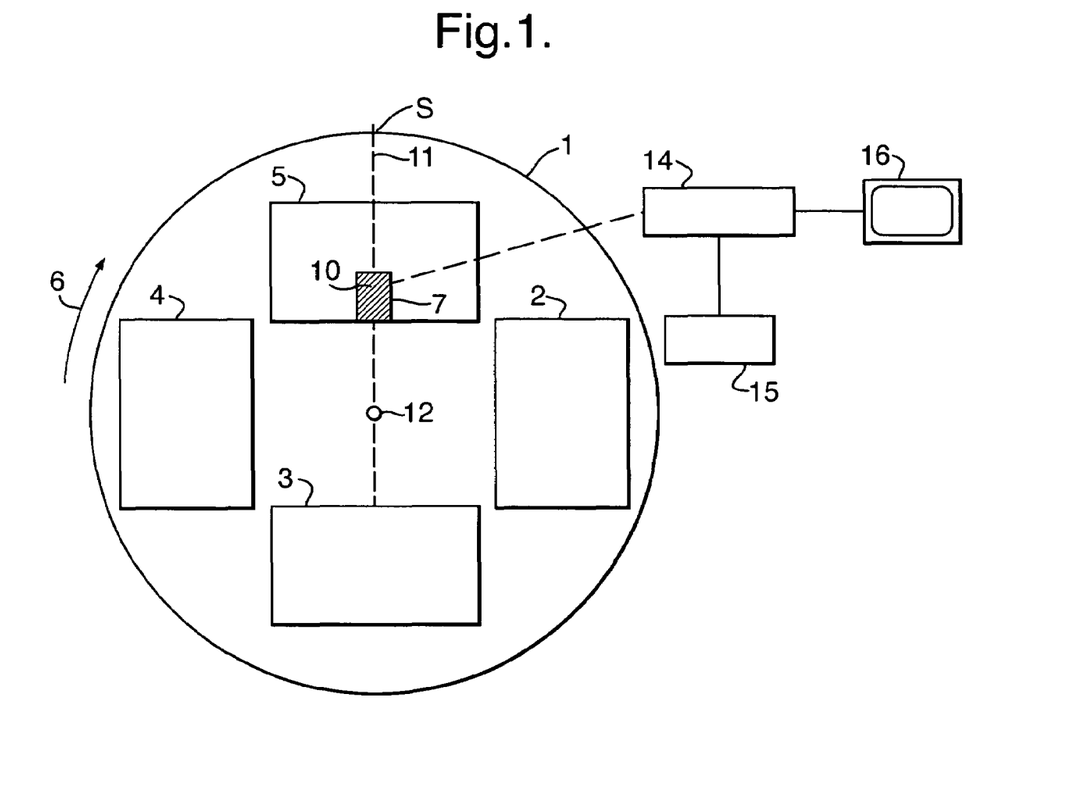
FIG. 1 is a schematic, plan view of a rotary thermoforming machine.

The following method has been used to successfully "rectify" the processed temperature data and the resulting displayed images on a rotary machine such as that shown in FIG. 1.

Figure 7:
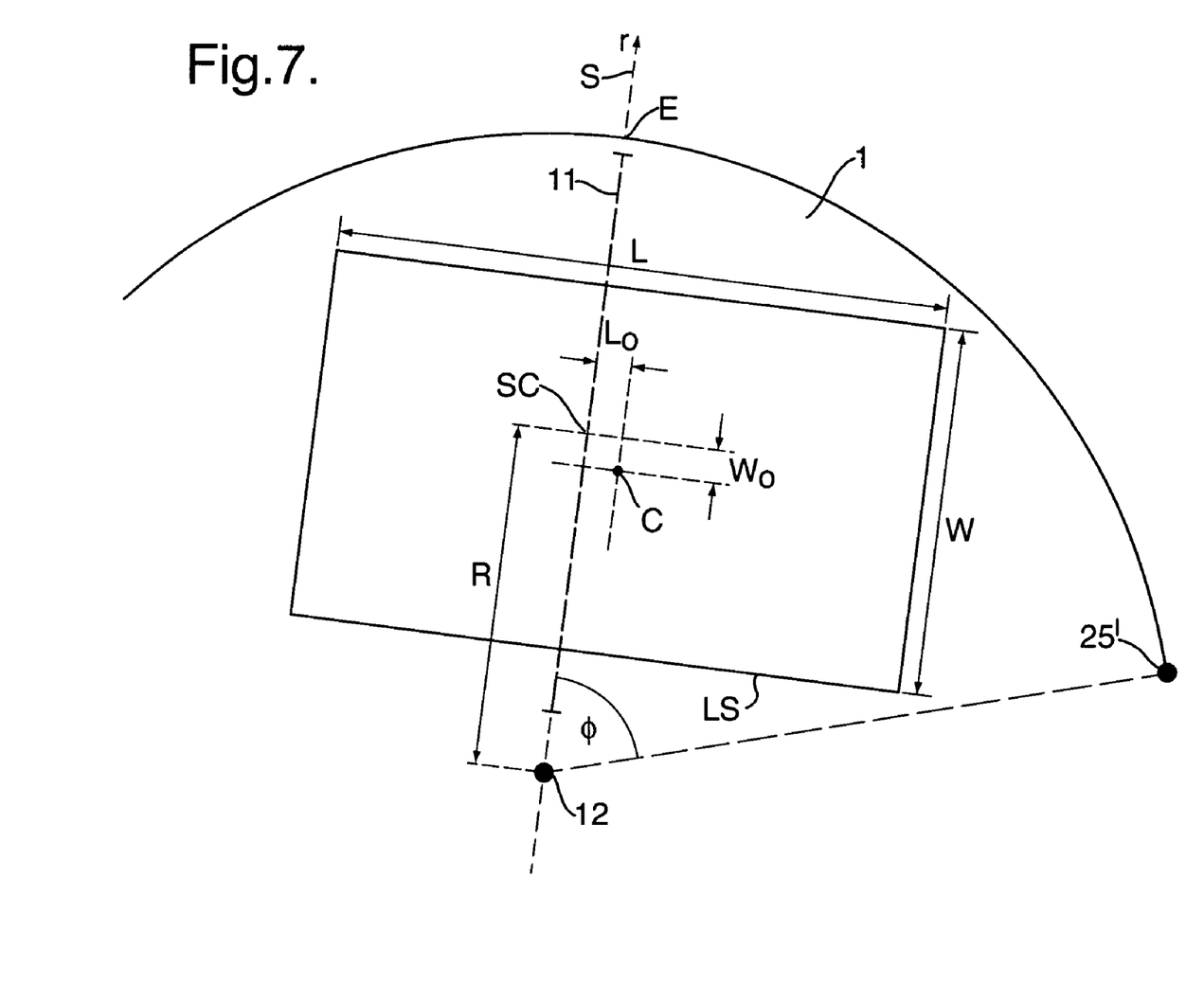
FIG. 7 illustrates part of the thermoforming machine of FIG. 1 and indicates certain dimensions.

The linescanner 10 is positioned above the carousel 1 of the rotary machine at a point along a radial line between the centre 12 of the carousel and its edge, E (FIG. 7).

The linescanner 10 is aligned, nominally vertically, so that the scan plane S intersects the carousel 1 in the (horizontal) plane of the sheets 2 to 5. Alignment is checked using an aiming laser (not shown). This is built into the linescanner 10 and defines the scan planes as well as the extremities of the scan.

The height H of the linescanner 10 above the sheet plane is measured. This measurement is made to the centre of rotation A of the measurement axis 7. The position A is fixed and known in relation to the linescanner housing.

In the plane of the sheets 2 to 5, the distance R between scan centre SC and the carousel rotation axis 12 is measured. Scan centre SC is found using a hot object, e.g. a soldering iron. A small hot source, such as the tip of a soldering iron is moved along the carousel radius in the scan plane until the (raw) linescanner signal shows the hot point to be at the zero degrees scan position. The radius in question is defined by the intersection of the scan plane, S, with the carousel (sheet) plane. The scan plane, S, is identified by the laser.

It should be noted that, whilst in this example the scan plane is nominally vertical (i.e. approximately orthogonal to the normally horizontal plane of the sheets), in practice the linescanner need not be vertically aligned. The described technique can readily be carried out with the scan plane displaced from the vertical. Indeed, it is only necessary that the line defined by the intersection of the scan plane, S, and the sheets plane lies along a radius of the carousel (i.e. the line passes through the carousel rotation axis 12), and that the height, H, of the linescanner 10 is measured in the scan plane, S.

For instance, the system works correctly for large deviations of up to approximately 30 degrees from vertical. The rotary encoder 20 produces a large number N of electrical pulses for each rotation of its spindle. N is chosen so that, at the highest rotation speed of the carousel 1, the time interval between electrical pulses is less than the time interval between scans.

A "once-per-rev" sensor 25' (FIG. 7) is coupled to the rotary machine carousel 1. This produces one electrical pulse per complete revolution of the carousel 1.

This is preferably a magnetic sensor. For example, a small magnet 25' is fixed to the carousel 1 and sensed as it passes a magnetometer-type sensor. An equivalent alternative is an optical reflectometer-type sensor with a reflective dot fixed on the carousel.

The magnet 25' or reflective dot is fixed on the outer circumference of the carousel 1 or on any convenient feature and the sensor located appropriately.

The carousel 1 is rotated and the number N of encoder pulses per revolution is accurately measured by recording encoder pulses and, simultaneously, pulses from the optical or magnetic sensor.

A rectangular area termed the "largest sheet", LS (FIG. 7), is defined on the carousel 1. This is an area (four areas for a four-sheet machine) within which the largest sheet processed is known to be contained, including allowance for positioning errors.

The largest sheet LS can be defined in various ways. Typically, the following method is used: To define a rectangular area with respect to the carousel requires five parameters (see FIG. 7)—length, width, radial distance, polar angle and "skew". In practice the following measurements are made:

L=length of largest sheet;
W=width of largest sheet;
$N_o$=number of encoder counts in the interval between the once-per-rev signal and the largest sheet, LS entering the scan plane, S;
$L_o$=the length offset between the centre C, of the largest sheet and the scan plane, S;
$W_o$=the width offset between centre of the "largest sheet" and scan-centre.

To measure $N_o$, the carousel is rotated so that the once-per-rev signal is sensed—for example, where a magnetic sensor is provided, the carousel is rotated such that the magnet is adjacent to the sensor. The carousel is then further rotated until the largest sheet, LS, impinges on the scan plane. $N_o$ is the number of rotary encoder counts between these two carousel positions.

To calculate $L_o$ or $W_o$, the carousel is rotated to a position where the edges of the largest sheet, LS, are square to the scan plane, S. $L_o$ is the perpendicular distance between the centre, C, of the largest sheet and the scan plane S. $W_o$ is the horizontal distance, measured parallel to the scan planes, between the centre, C of the largest sheet and the scan centre SC.

Note that the distance R between scan-centre SC and the carousel rotation axis 12 has been measured previously.

These parameters fully define the size, position and orientation of the largest sheet LS, with respect to the carousel 1. Therefore any position specified in polar coordinates r, φ with respect to the carousel 1 may, by a coordinate transformation, be re-specified in Cartesian coordinates x, y with respect to the largest sheet, LS.

Figure 5A:
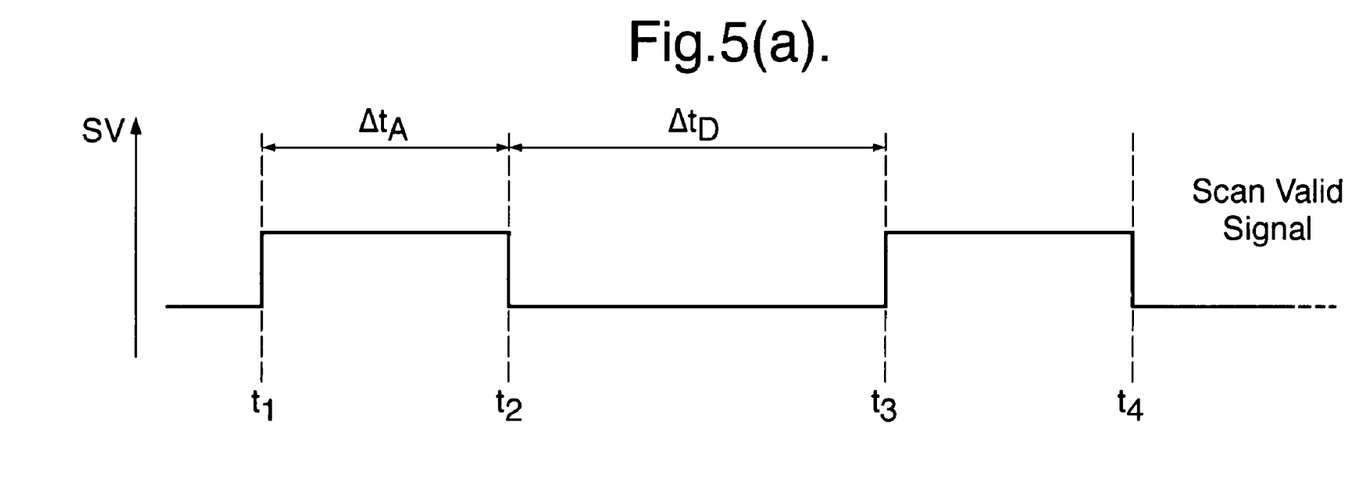
FIGS. 5a and 5b illustrate a "scan valid" control signal and a received temperature signal respectively.
Figure 5B:
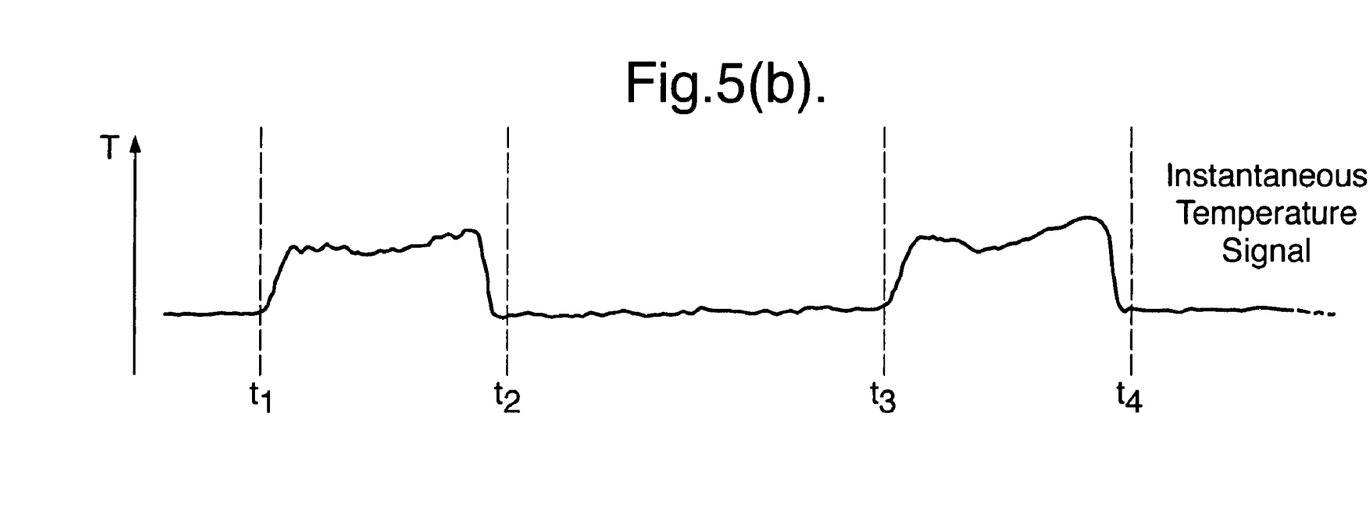

The linescanner temperature signal, T, and a scan valid signal, SV (FIG. 5), are input to a computer 14, together with the signal from rotary encoder 20 and the once-per-rev sensor signal.

The computer 14 samples the temperature signal, T, at uniform time intervals corresponding to successive area pixels on the sheet 5. Data is saved only when the scan valid signal, SV, is "high" and is organised into a series of "scan lines", a new line being started each time the scan valid signal, SV, transitions from low to high. The "active scan line" 11 is the line along which valid temperature measurements may be taken—i.e. the portion of the scan plane S intersecting the sheet 5 for which the scan valid signal, SV, is "high".

Temperature samples within each scan line are numbered and labelled with a radial distance r from the carousel axis 12, and a polar angle φ about the carousel axis 12 referenced to the once-per-rev sensor magnet 25'.

Radial distance is calculated as r=H. tan θ+R where θ is described above for example, θ=40*(n/500−1) where the scan half-angle is 40 degrees, and the current sample number is n of 1000 samples per scan line.

The polar angle φ is measured by counting the number of rotary encoder pulses generated. Since the last once-per-rev signal. For example, φ=360*($N_t$−N)/N where N is the count and $N_t$ is the number of encoder pulses per full revolution of the carousel.

The co-ordinates may then be transformed so as to put the r, φ data into Cartesian coordinates x, y referenced to the largest sheet area, LS. Every temperature sample, as it is taken, is labelled with its x, y position with respect to the largest sheet, LS. A method for carrying out this transformation will now be described.

The incoming data from the linescanner 10 is fed to a pre-processing algorithm performed by the microprocessor or computer 14. This transforms the raw data, as it arrives, into "Cartesian" data—i.e. scan lines in a Cartesian coordinate system referenced to the largest sheet defining the temperatures in a regular array of region pixels. This Cartesian data is then passed on to the remainder of the processing and display software. The pre-processing algorithm works as follows:

Starting when the largest sheet, LS, begins to cross the scan plane S, incoming lines are buffered, with each sample labelled with both polar and Cartesian coordinates.

Each arriving scan line is checked (i.e. the samples examined according to their x,y position labels) to see if it can be processed into a new "Cartesian" scan line represented in the Cartesian system where the x values are the same for each sample in the line. Each element of this resulting line is assigned the temperature of the nearest-located sample.

So, for the first Cartesian scan line:

If 0 defines the start of the largest sheet in the length direction and Dx defines the distance between the current and previous scan lines (measured along the outer border R–R' of the largest sheet), then samples with −Dx/2<x<Dx/2 are assigned to the first Cartesian line.

As regards Y position in this first Cartesian line, samples with n*Dy<y<(n+1)*Dy are assigned to y value n*Dy. Here Dy=W/Ny where Ny is the number of samples taken across the largest sheet when it is positioned orthogonal to the scan plane S.

The second Cartesian scan line is filled with samples whose x values fulfill Dx/2<x<3*Dx/2 (the same formula as above applies for y position in the line) and so on for each new Cartesian scan line.

Where more than one sample is assigned to an array element they are combined to give an average signal level. Where no sample is assigned to an array element, one is "borrowed" from an adjacent element, by allocating the element the same signal value as the nearest sampled element.

Old lines which are not anymore usable to produce a new Cartesian scan line are dropped from the buffer and arriving scan lines are added to the buffer. The buffered samples are again examined according to their x, y labels and used to fill the next Cartesian scan line. This process continues until there are no more new scan lines crossing the largest sheet.

Each Cartesian scan line, as it is completed, is then passed forward for further processing. Having undergone the co-ordinate transformation, the data appears as though the line scanner was continuously scanning orthogonal to the largest sheet and can henceforth be processed as Cartesian data. Ultimately, the data is stored in the store 15 and displayed on the computer screen 16 as a Cartesian array of pixels whose colour represents temperature according to a pre-defined "palette". The image builds up in real time, with a slight delay equal to the time between the first and second corners of the largest sheet, LS, crossing the scan plane S.

The system described makes a complete point-to-point transformation, allowing the rectified image substantially the same spatial resolution as present in the raw (uncorrected) image. If so desired, the rectified image can subsequently be divided into a number of "zones", and only representative zone temperatures reported. For example, the temperature measurements at each of the (corrected) pixels within a pre-defined zone may be averaged and the resulting average zone temperature displayed. Thus, the level of resolution output can be selected as appropriate for the particular application.

Figure 6A:
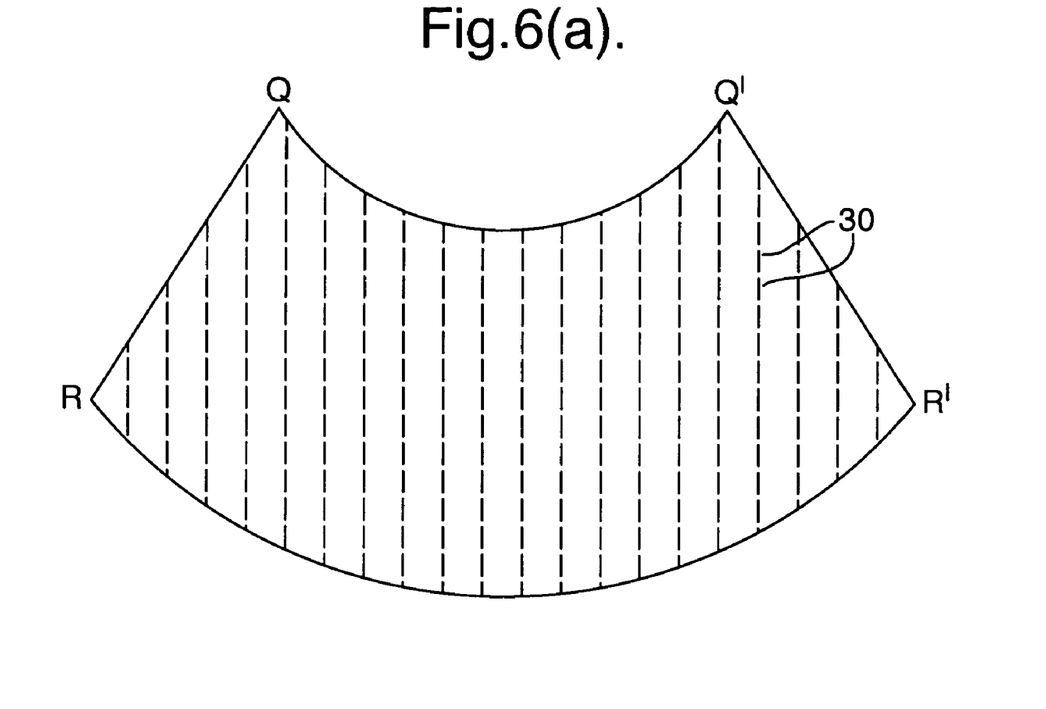
FIGS. 6a and 6b illustrate the arrangement of area and region pixels.
Figure 6B:
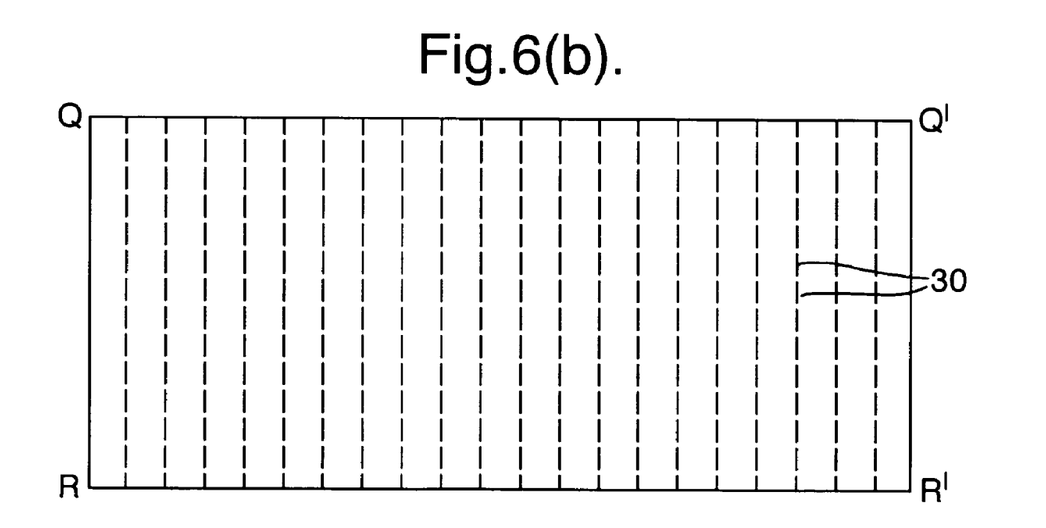
Figure 6C:
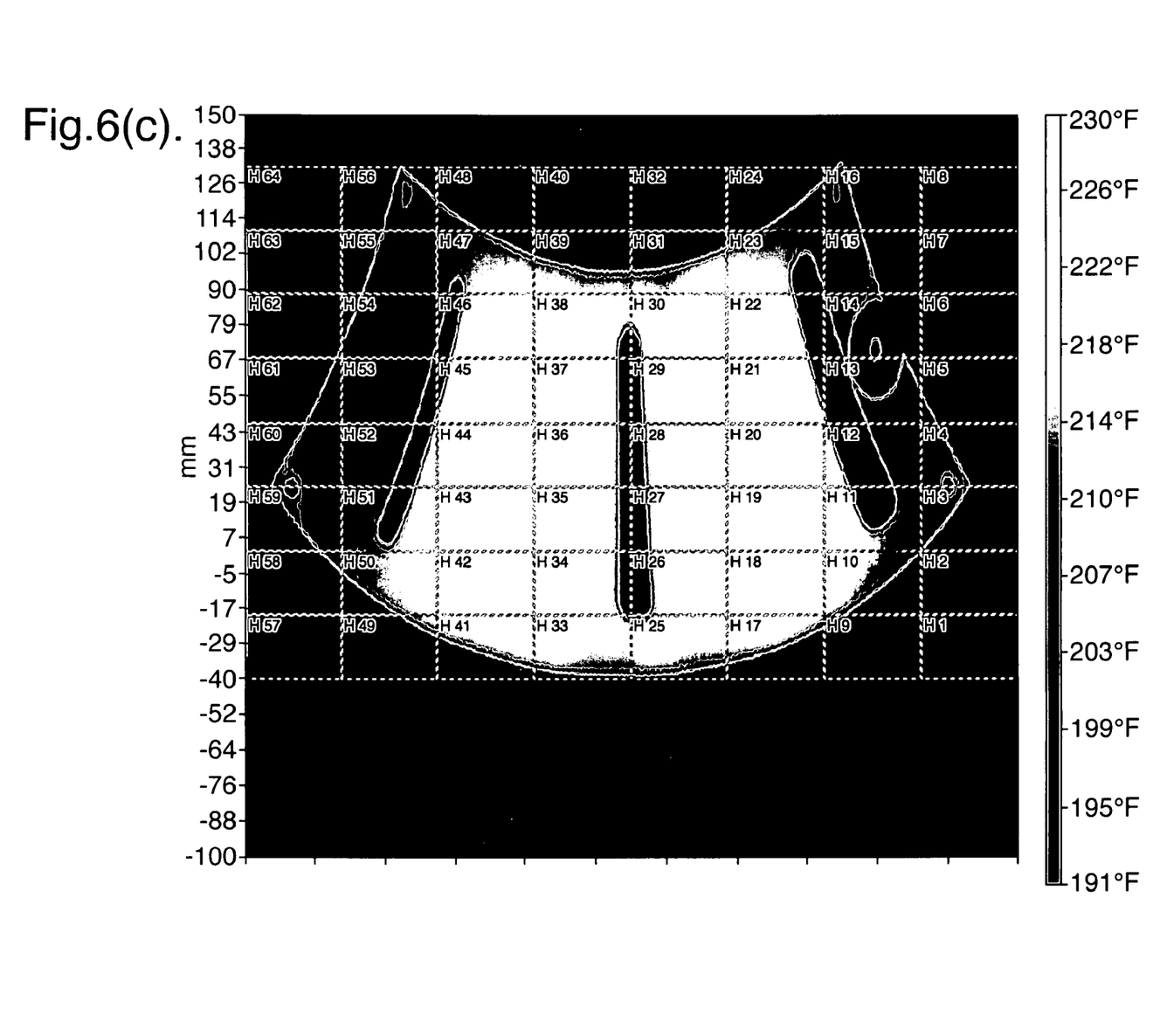
FIGS. 6c and 6d show photos of a test target sheet showing uncorrected and corrected images respectively.
Figure 6D:
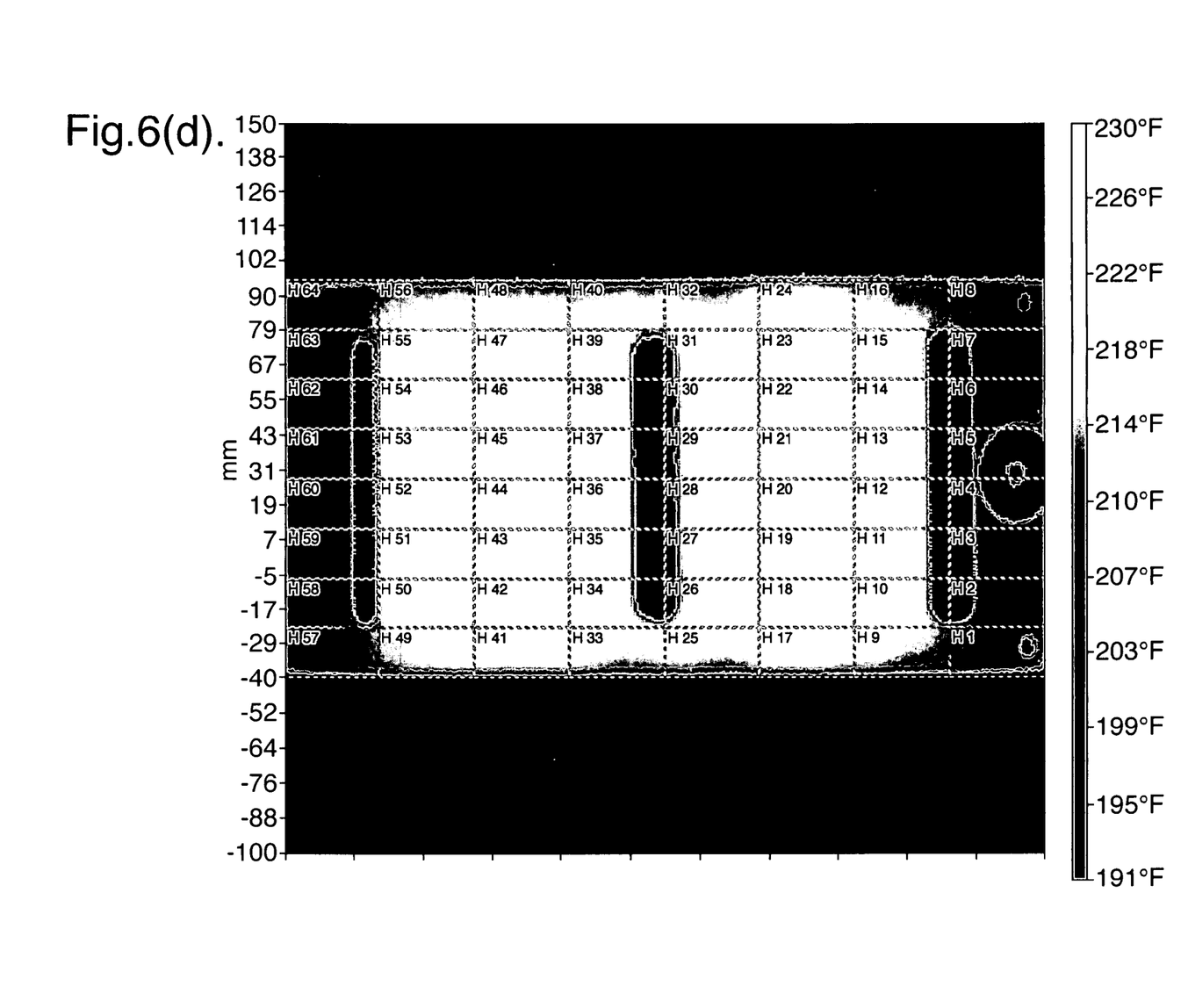

FIG. 6A illustrates in highly schematic form the lines of area pixels from which raw temperature data is obtained and as can be seen this has the effect of defining a distorted sheet area. The processing algorithm described above then rectifies this to generate temperature values for region pixels arranged on a rectangular grid pattern (FIG. 6B).

Typically, a linescanner of this type will obtain 1000 samples per line scan and 100 line scans per second. In a typical example, this will lead to a total of 200,000 areas being sampled and this will be converted to substantially 200,000 regions on the rectangular grid.

In summary, a system is provided for generating images of heated sheets on a rotary thermoforming machine which comprises an infra-red linescanner 10, a rotary encoder 20, a once-per-rev sensor 25, a computer 14 to receive their signals and software which processes and displays online and of course offline a temperature image corrected for geometrical distortions caused by the circular and non-uniform motion of the sheets.

Typically, the spatial resolution in the temperature data is, in the direction transverse to the sheet's motion, substantially the same as would be obtained with the same linescanner and geometry were the sheet's motion linear rather than circular.

Since the system monitors the motion of each sheet during scanning—in the example above, by means of the rotary encoder 20 and the once-per-rev sensor 25—the distortion is corrected individually for every sheet image. This means that unpredictable, irregular motion (e.g. in terms of position, velocity or acceleration) of the carousel is automatically compensated for in addition to the expected non-uniform movement as the carousel moves the sheet from one processing location to another. Further, sheets of different sizes and shapes may be processed without changes to the system set-up (provided only that the sheets are contained within the area defined as the "largest sheet").

The scan plane, S, of the linescanner may be defined by a laser built into the linescanner, while the linescanner typically operates in a narrow wavelength band near 4.3 microns.

Preferably, temperature samples are buffered between the times of the first and second corners of a rectangular measurement area crossing the scan plane and are, thereafter, displayed as a pixel map of that area, the map building up in real time as each successive scan is taken.

What is claimed is:

1. A temperature monitoring system for generating a representation of the temperature of the regions of a heated sheet of a rotary thermoforming machine, the system comprising:
   a temperature detector for detecting the respective temperatures of areas of the sheet extending in a line across the sheet;
   a device for monitoring relative rotary movement between the sheet and the temperature detector; and
   a processing system for
      a) recording the coordinates and the detected temperature of each area whose temperature is monitored; and
      b) determining the temperature of regions of the sheet defined on a different basis to the areas by applying a predetermined algorithm to the data stored in step a) which takes account of the relative rotary movement of the sheet.

2. A system according to claim 1, wherein the processing system defines the coordinates of each area in step a) by means of a polar coordinate system centered on the axis of rotation of the sheet.

3. A system according to claim 2, wherein each region whose temperature is determined in step b) has substantially the same size.

4. A rotary thermoforming machine including a temperature monitoring system according to claim 2.

5. A system according to claim 1, wherein each region whose temperature is determined in step b) has substantially the same size.

6. A rotary thermoforming machine including a temperature monitoring system according to claim 5.

7. A system according to claim 1, wherein the regions for which temperatures are determined in step b) are defined in a Cartesian array.

8. A system according to claim 1, wherein the processing system is adapted to define the regions at substantially the same resolution as the areas.

9. A system according to claim 1, wherein the predetermined algorithm compensates for acceleration and deceleration movements of the sheet.

10. A system according to claim 1, wherein the temperature detector detects the temperature of successive lines of said areas, the processing system being adapted to carry out steps a) and b) during the detection process.

11. A system according to claim 10, wherein the processing system causes the temperatures of the regions to be displayed during the scanning process.

12. A system according to claim 11, wherein the linescanner incorporates a laser.

13. A system according to claim 1, further comprising a display for displaying the temperature of the regions as determined in step b) in the form of a map.

14. A system according to claim 13, wherein the processing system causes the temperatures of the regions to be displayed during the scanning process.

15. A system according to claim 1, wherein the temperature detector comprises a linescanner with an opto-mechanical scanning mechanism.

16. A system according to claim 1, further comprising a rotation detector for monitoring rotary movement of the sheet, the processing system being responsive to the rotary detector to determine the coordinates in step a).

17. A rotary thermoforming machine including a temperature monitoring system according to claim 1.

18. A temperature monitoring system for generating a representation of the temperature of regions of a heated sheet in a rotary thermoforming machine, the system comprising:
- a temperature detecting linescanner for detecting the respective temperatures of areas of the sheet extending in a line across the sheet relative to a direction of rotary movement of the sheet;
- a device for monitoring relative rotary movement between the sheet and the temperature detecting linescanner; and
- a processing system for
  - recording, for each area whose temperature is detected by the temperature detecting linescanner, the detected temperature and the coordinates of that area;
  - transforming the coordinates, so recorded, to Cartesian coordinates referenced to the plane of the sheet by accounting for the relative rotary movement of the sheet; and
  - determining the temperature of regions of the sheet defined by the Cartesian coordinates based on the transformed coordinates and the recorded temperatures.

19. A method of generating a representation of the temperature of the regions of a heated sheet, the method comprising:
- rotating a rotary thermoforming machine's carousel on which the heated sheet is disposed so that the sheet passes by a temperature detector;
- detecting, with the temperature detector, the respective temperatures of areas of the sheet extending in a line across the sheet as the sheet moves past the temperature detector;
- monitoring relative rotary movement between the sheet and the temperature detector;
- recording the coordinates and temperature of each area whose the detected temperature is monitored; and
- determining the temperature of regions of the sheet defined on a different basis to the areas by applying a predetermined algorithm to the data, so recorded, which takes account of the relative rotary movement of the sheet; and
- outputting the temperatures of the regions, so determined.

20. A method according to claim 19, wherein the predetermined algorithm transforms recorded coordinates of the areas to Cartesian coordinates.

21. A method according to claim 19, wherein outputting the temperatures of the regions comprises outputting the temperatures of the regions for display.

22. A method according to claim 19, wherein outputting the temperatures of the regions comprises outputting the temperatures of the regions to a storage device for storage.

* * * * *